US012142222B2

(12) United States Patent
Lee et al.

(10) Patent No.: US 12,142,222 B2
(45) Date of Patent: Nov. 12, 2024

(54) PIXEL CIRCUIT AND DISPLAY DEVICE INCLUDING THE PIXEL CIRCUIT FOR IMPROVING RESOLUTION

(71) Applicant: Samsung Display Co., LTD., Yongin-si (KR)

(72) Inventors: Seungchan Lee, Hwaseong-si (KR); Seongjun Lee, Seoul (KR); Wangjo Lee, Suwon-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/320,081

(22) Filed: May 18, 2023

(65) Prior Publication Data

US 2024/0029656 A1 Jan. 25, 2024

(30) Foreign Application Priority Data

Jul. 21, 2022 (KR) ........................ 10-2022-0090636

(51) Int. Cl.

*G09G 3/3291* (2016.01)
*G09G 3/3258* (2016.01)
*G09G 3/30* (2006.01)
*G09G 3/3225* (2016.01)
*G09G 3/3233* (2016.01)
(Continued)

(52) U.S. Cl.

CPC ......... *G09G 3/3258* (2013.01); *G09G 3/3291* (2013.01); *G09G 3/30* (2013.01);
(Continued)

(58) Field of Classification Search

CPC ............... G09G 3/3258; G09G 3/3291; G09G 2300/0814; G09G 2300/0819;
(Continued)

(56) References Cited

U.S. PATENT DOCUMENTS

| | | | |
|---|---|---|---|
| 11,088,284 B2 | 8/2021 | Son et al. | |
| 2012/0001896 A1 | 1/2012 | Han et al. | |

(Continued)

FOREIGN PATENT DOCUMENTS

| | | | | |
|---|---|---|---|---|
| CN | 113971932 A * | 1/2022 | .......... G09G 3/3225 |
| KR | 10-2018-0003380 A | 1/2018 | |

(Continued)

*Primary Examiner* — Adam J Snyder

(74) *Attorney, Agent, or Firm* — Lewis Roca Rothgerber Christie LLP

(57) ABSTRACT

A pixel circuit includes a driving transistor, a second transistor operating in response to the first gate signal, a third transistor operating in response to the second gate signal, a fourth transistor operating in response to an initialization control signal, a fifth transistor operating in response to an emission control signal, a sixth transistor operating in response to the emission control signal, a seventh transistor operating in response to a bias control signal, a storage capacitor, a first capacitor or a second capacitor, and a light emitting element. The first capacitor or the second capacitor includes a first terminal receiving the first gate signal or the emission control signal and a second terminal connected to a first terminal of the light emitting device, and the voltage of the first terminal of the light emitting element is boosted based on the first gate signal or the light emission control signal.

8 Claims, 11 Drawing Sheets

(51) Int. Cl.
*G09G 3/3266* (2016.01)
*G09G 3/3275* (2016.01)

(52) U.S. Cl.
CPC ......... *G09G 3/3225* (2013.01); *G09G 3/3233* (2013.01); *G09G 3/3266* (2013.01); *G09G 3/3275* (2013.01); *G09G 2300/0814* (2013.01); *G09G 2300/0819* (2013.01); *G09G 2300/0842* (2013.01); *G09G 2300/0866* (2013.01); *G09G 2310/0251* (2013.01); *G09G 2310/061* (2013.01); *G09G 2330/028* (2013.01); *G09G 2340/0435* (2013.01)

(58) Field of Classification Search
CPC ... G09G 2300/0866; G09G 2310/0251; G09G 2340/0435; G09G 3/3233; G09G 3/3225; G09G 3/30; G09G 3/3266; G09G 3/3275; G09G 2300/0842; G09G 2310/061; G09G 2330/028
See application file for complete search history.

(56) References Cited

U.S. PATENT DOCUMENTS

| | | | | |
|---|---|---|---|---|
| 2015/0279278 | A1* | 10/2015 | Park | G09G 3/3233 345/212 |
| 2017/0124953 | A1* | 5/2017 | Shim | G09G 3/3233 |
| 2018/0293939 | A1* | 10/2018 | Kim | G09G 3/3233 |
| 2019/0096330 | A1* | 3/2019 | Kim | G09G 3/3233 |
| 2020/0175926 | A1* | 6/2020 | Jeong | G09G 3/3266 |
| 2020/0211452 | A1* | 7/2020 | Lee | G09G 3/3233 |
| 2020/0394961 | A1* | 12/2020 | Kim | G09G 3/3233 |
| 2021/0026423 | A1* | 1/2021 | Choi | G09G 3/3233 |
| 2021/0264857 | A1 | 8/2021 | Wang et al. | |
| 2022/0344430 | A1* | 10/2022 | Zhou | G09G 3/3233 |

FOREIGN PATENT DOCUMENTS

| | | | |
|---|---|---|---|
| KR | 10-2019-0007727 | A | 1/2019 |
| KR | 10-2021-0024339 | A | 3/2021 |

* cited by examiner

PIXEL CIRCUIT AND DISPLAY DEVICE INCLUDING THE PIXEL CIRCUIT FOR IMPROVING RESOLUTION

CROSS REFERENCED-TO RELATED APPLICATION

The present application claims priority to and the benefit of Korean Patent Application No. 10-2022-0090636, filed on Jul. 21, 2022, in the Korean Intellectual Property Office KIPO, the entire content of which is incorporated herein by reference.

BACKGROUND

1. Field

Aspects of some embodiments of the present inventive concept relate to a pixel circuit and a display device including the pixel circuit.

2. Description of the Related Art

Generally, an organic light emitting display device includes a display panel including a plurality of pixel circuits, a first scan driver providing a bias control signal and a first gate signal, a second scan driver providing a second gate signal and an initialization control signal, a data driver providing a data signal, an emission control driver providing an emission control signal, and a timing controller controlling the first scan driver, the second scan driver, the data driver, the emission control driver, etc.

Each of the pixel circuits is connected to a first scan line transferring a bias control signal and a first gate signal, a second scan line transferring a second gate signal and an initialization control signal, a data line transferring a data signal, and an emission control line transferring an emission control signal.

A display device may include a first initialization line transferring a first initialization voltage for initializing a gate terminal of a driving transistor, and a second initialization line transferring a second initialization voltage for initializing a first terminal (e.g., an anode) of a light emitting diode. In order to initialize a storage capacitor and reserve a black margin at the same time, the first initialization line and the second initialization line are separated. However, because the number of pixels may be reduced when increasing an area in which the initialization lines are arranged and because additional lines are required to improve a voltage drop of the initialization wires, some display devices may have a limit in increasing a resolution.

The above information disclosed in this Background section is only for enhancement of understanding of the background and therefore the information discussed in this Background section does not necessarily constitute prior art.

SUMMARY

Aspects of some embodiments of the present inventive concept relate to a pixel circuit and a display device including the pixel circuit. For example, aspects of some embodiments of the present inventive concept relate to a pixel circuit included in a display device (e.g., an organic light emitting display device) in which a driving frequency of a display panel can be changed (i.e., a driving time of a panel driving frame can be changed) and the display device including the pixel circuit.

Aspects of some embodiments of the present inventive concept include a pixel circuit having a structure capable of generating a boosted initialization voltage for initializing a first terminal (e.g., an anode) of a light emitting diode using an initialization voltage while including only one initialization line that transfers the initialization voltage for initializing a gate terminal of a driving transistor.

Aspects of some embodiments of the present inventive concept include a display device including the pixel circuit.

According to some embodiments, a pixel circuit includes a first transistor including a first terminal connected to a first node, a gate terminal connected to a second node, and a second terminal connected to a third node, a second transistor including a first terminal connected to a data line, a second terminal connected to the first node, and a gate terminal configured to receive a first gate signal, a third transistor including a first terminal connected to the third node, a second terminal connected to the second node, and a gate terminal configured to receive a second gate signal, a fourth transistor including a first terminal connected to the second node, a second terminal configured to receive an initialization voltage, and a gate terminal configured to receive an initialization control signal, a fifth transistor including a first terminal configured to receive a first power voltage, a second terminal connected to the first node, and a gate terminal configured to receive an emission control signal, a sixth transistor including a first terminal connected to the third node, a second terminal connected to a fourth node, and a gate terminal configured to receive the emission control signal, a seventh transistor including a first terminal connected to the fourth node, a second terminal connected to a fifth node, and a gate terminal configured to receive a bias control signal, a storage capacitor including a first terminal configured to receive the first power voltage, and a second terminal connected to the second node, a first capacitor including a first terminal configured to receive the first gate signal, and a second terminal connected to the fourth node and a light emitting element including a first terminal connected to the fourth node, and a second terminal configured to receive a second power voltage lower than the first power voltage.

According to some embodiments, the first gate signal may boost a voltage of the fourth node through the first capacitor.

According to some embodiments, a boosting voltage due to the first gate signal may be determined by a series connection of the first capacitor and a parasitic capacitor of the light emitting element, and the voltage of the fourth node may be a sum of the initialization voltage, and the boosting voltage.

According to some embodiments, when a driving time of a panel driving frame is a reference driving time, one display scan operation may be performed and when the driving time of the panel driving frame is not the reference driving time, the display scan operation, and at least one self scan operation may be performed.

According to some embodiments, when the display scan operation is performed, each of the first gate signal, the second gate signal, the initialization control signal, the bias control signal, and the emission control signal may include at least one turn-on voltage period.

According to some embodiments, within a turn-off voltage period of the emission control signal, the turn-on voltage period of the initialization control signal, the turn-on voltage period of the first gate signal, the turn-on voltage period of the second gate signal, and the turn-on voltage period of the bias control signal may be located.

According to some embodiments, when the self scan operation is performed, each of the bias control signal, the first gate signal, and the emission control signal may include at least one turn-on voltage period, and each of the second gate signal, and the initialization control signal may not include the turn-on voltage period.

According to some embodiments, within a turn-off voltage period of the emission control signal, each of the first gate signal, and the bias control signal may include at least one turn-on voltage period According to some embodiments, the pixel circuit may further include a boost capacitor including a first terminal connected the second node, and a second terminal configured to receive the first gate signal.

According to some embodiments, a pixel circuit includes a first transistor including a first terminal connected to a first node, a gate terminal connected to a second node, and a second terminal connected to a third node, a second transistor including a first terminal connected to a data line, a second terminal connected to the first node, and a gate terminal configured to receive a first gate signal, a third transistor including a first terminal connected to the third node, a second terminal connected to the second node, and a gate terminal configured to receive a second gate signal, a fourth transistor including a first terminal connected to the second node, a second terminal configured to receive an initialization voltage, and a gate terminal configured to receive an initialization control signal, a fifth transistor including a first terminal configured to receive a first power voltage, a second terminal connected to the first node, and a gate terminal configured to receive an emission control signal, a sixth transistor including a first terminal connected to the third node, a second terminal connected to a fourth node, and a gate terminal configured to receive the emission control signal, a seventh transistor including a first terminal connected to the fourth node, a second terminal connected to a fifth node, and a gate terminal configured to receive a bias control signal, a storage capacitor including a first terminal configured to receive the first power voltage and a second terminal connected to the second node, a second capacitor including a first terminal configured to receive the emission control signal, and a second terminal connected to the fourth node and a light emitting element including a first terminal connected to the fourth node and a second terminal configured to receive a second power voltage lower than the first power voltage.

According to some embodiments, the emission control signal may boost a voltage of the fourth node through the second capacitor.

According to some embodiments, a boosting voltage due to the emission control signal may be determined by a series connection of the second capacitor, and a parasitic capacitor of the light emitting element, and the voltage of the fourth node may be a sum of the initialization voltage, and the boosting voltage.

According to some embodiments, when a driving time of a panel driving frame is a reference driving time, one display scan operation may be performed, and when the driving time of the panel driving frame is not the reference driving time, one display scan operation, and at least one self scan operation may be performed.

According to some embodiments, when the display scan operation is performed, each of the first gate signal, the second gate signal, the initialization control signal, the bias control signal, and the emission control signal may include at least one turn-on voltage period.

According to some embodiments, within a turn-off voltage period of the emission control signal, the turn-on voltage period of the initialization control signal, the turn-on voltage period of the first gate signal, the turn-on voltage period of the second gate signal, and the turn-on voltage period of the bias control signal may be located.

According to some embodiments, when the self scan operation is performed, each of the bias control signal, the first gate signal, and the emission control signal includes at least one turn-on voltage period, and each of the second gate signal, and the initialization control signal may not include the turn-on voltage period.

According to some embodiments, the pixel circuit may further include a boost capacitor including a first terminal connected the second node, and a second terminal configured to receive the first gate signal.

According to some embodiments, the display device includes a display panel including pixels, a scan driver configured to apply a bias control signal, an initialization control signal, a first gate signal, and a second gate signal to each of the pixels, a data driver configured to apply data voltages to the pixels and a timing controller configured to control the scan driver, and the data driver, and a pixel circuit of each of the pixels includes a first transistor including a first terminal connected to a first node, a gate terminal connected to a second node, and a second terminal connected to a third node, a second transistor including a first terminal connected to a data line, a second terminal connected to the first node, and a gate terminal configured to receive a first gate signal, a third transistor including a first terminal connected to the third node, a second terminal connected to the second node, and a gate terminal configured to receive the second gate signal, a fourth transistor including a first terminal connected to the second node, a second terminal configured to receive an initialization voltage, and a gate terminal configured to receive the initialization control signal, a fifth transistor including a first terminal configured to receive a first power voltage, a second terminal connected to the first node, and a gate terminal configured to receive an emission control signal, a sixth transistor including a first terminal connected to the third node, a second terminal connected to a fourth node, and a gate terminal configured to receive the emission control signal, a seventh transistor including a first terminal connected to the fourth node, a second terminal connected to a fifth node, and a gate terminal configured to receive the bias control signal, a storage capacitor including a first terminal configured to receive the first power voltage, and a second terminal connected to the second node, a first capacitor including a first terminal configured to receive the first gate signal, and a second terminal connected to the fourth node and a light emitting element including a first terminal connected to the fourth node, and a second terminal configured to receive a second power voltage lower than the first power voltage.

According to some embodiments, the first gate signal boosts a voltage of the fourth node through the first capacitor.

According to some embodiments, a boosting voltage due to the first gate signal is determined by a series connection of a first capacitor, and the parasitic capacitor of the light emitting element, and wherein a voltage of the fourth node is a sum of the initialization voltage, and the boosting voltage.

Therefore, a pixel circuit according to some embodiments includes a first transistor including a first terminal connected to a first node, a gate terminal connected to a second node, and a second terminal connected to a third node, a second transistor including a first terminal connected to a data line, a second terminal connected to the first node, and a gate terminal configured to receive a first gate signal, a third transistor including a first terminal connected to the third node, a second terminal connected to the second node, and a gate terminal configured to receive a second gate signal, a fourth transistor including a first terminal connected to the second node, a second terminal configured to receive an initialization voltage, and a gate terminal configured to receive an initialization control signal, a fifth transistor including a first terminal configured to receive a first power voltage, a second terminal connected to the first node, and a gate terminal configured to receive an emission control signal, a sixth transistor including a first terminal connected to the third node, a second terminal connected to a fourth node, and a gate terminal configured to receive the emission control signal, a seventh transistor including a first terminal connected to the fourth node, a second terminal connected to a fifth node, and a gate terminal configured to receive a bias control signal, a storage capacitor including a first terminal configured to receive the first power voltage, and a second terminal connected to the second node, a first capacitor including a first terminal configured to receive the first gate signal, and a second terminal connected to the fourth node and a light emitting element including a first terminal connected to the fourth node, and a second terminal configured to receive a second power voltage lower than the first power voltage. Thus, the pixel circuit having the structure may generate the boosted initialization voltage for initializing the first terminal (e.g., the anode) of the light emitting element using the initialization voltage while including only one initialization line that transfers the initialization voltage for initializing the gate terminal of the driving transistor.

In addition, a display device according to some embodiments may realize high resolution by reducing the number of initialization lines included in the display panel compared to alternative display devices (e.g., a conventional display device including a first initialization line transferring the first initialization voltage for initializing the gate terminal of the driving transistor and a second initialization line transferring the second initialization voltage for resetting the first terminal of the light emitting element). While the display device includes only one initialization line, the display device may initialize the gate terminal of the driving transistor with the initialization voltage transferred through one initialization line, and may reset the first terminal of the light emitting element to the boosted initialization voltage generated by adding the boosting voltage due to the first gate signal or the boosting voltage due to the emission control signal to the initialization voltage.

However, the characteristics of embodiments according to the present inventive concept are not limited to the above-described characteristics, and may be variously expanded without departing from the spirit and scope of embodiments according to the present inventive concept.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, embodiments of the present inventive concept will be explained in detail with reference to the accompanying drawings.

Figure 1:
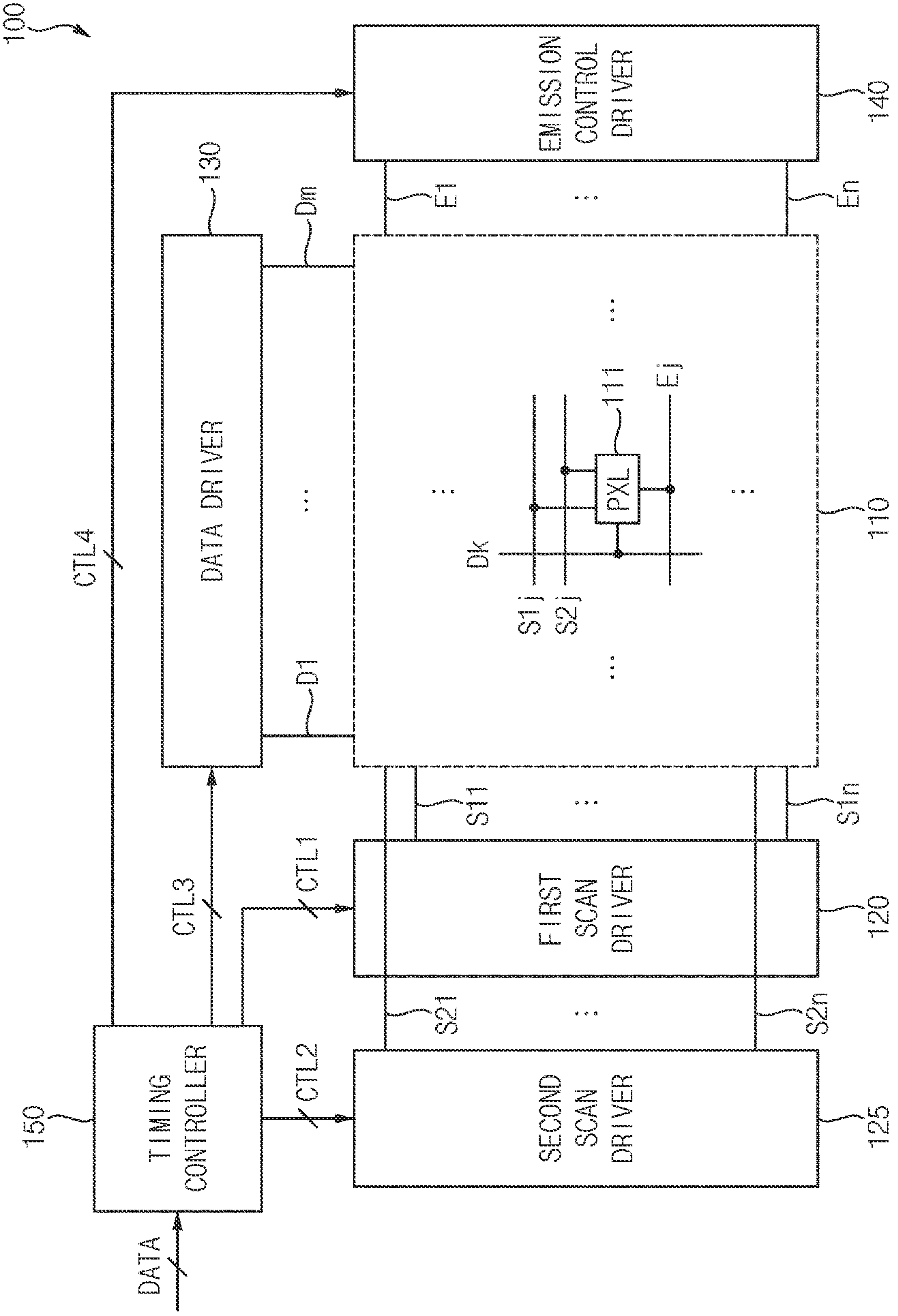
FIG. 1 is a block diagram illustrating a display device according to some embodiments.
Figure 2:
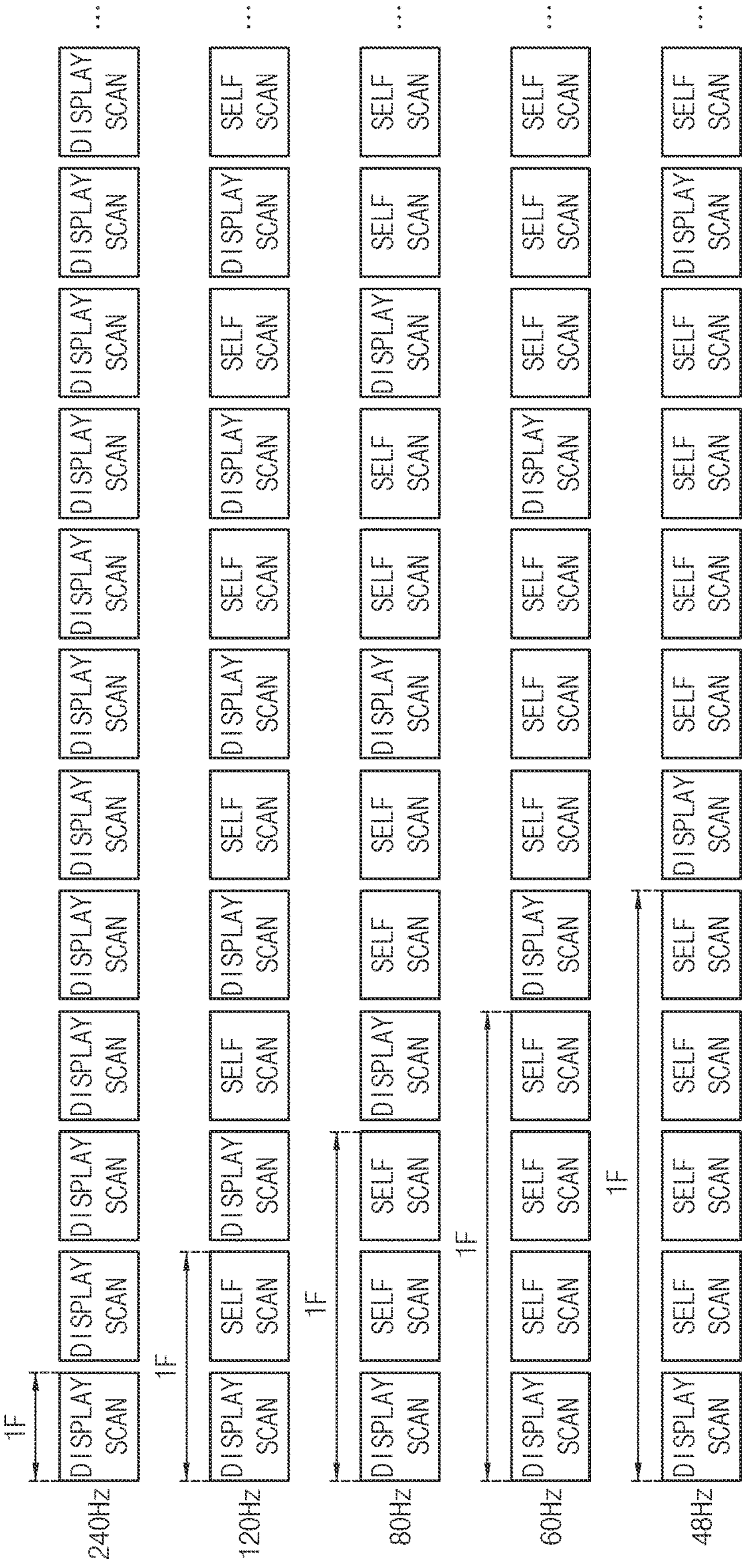
FIG. 2 is a concept diagram for describing that the display device of FIG. 1 operates.
Figure 3:
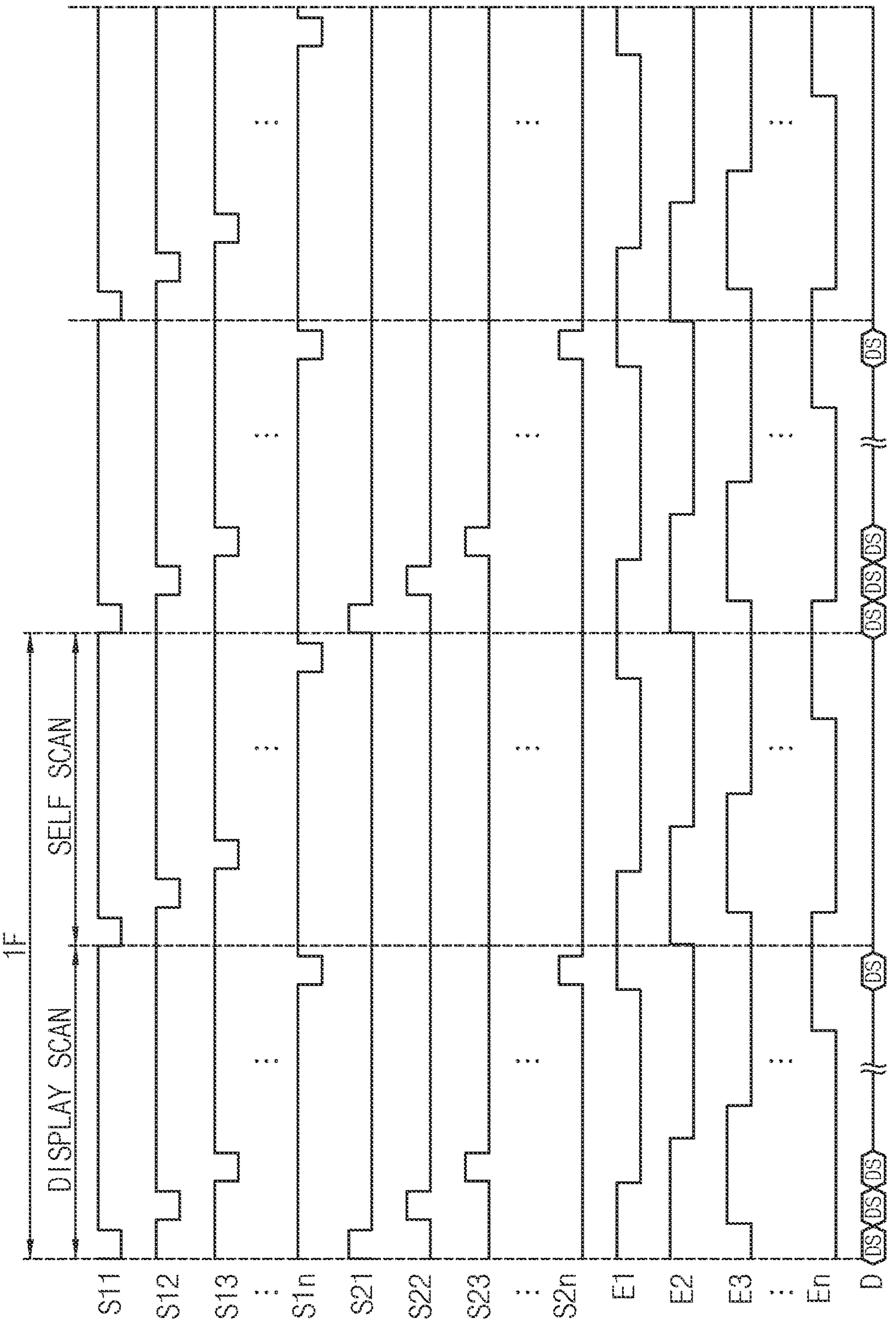
FIG. 3 is a timing diagram illustrating an example in which the display device of FIG. 1 operates at a first driving frequency.
Figure 4:
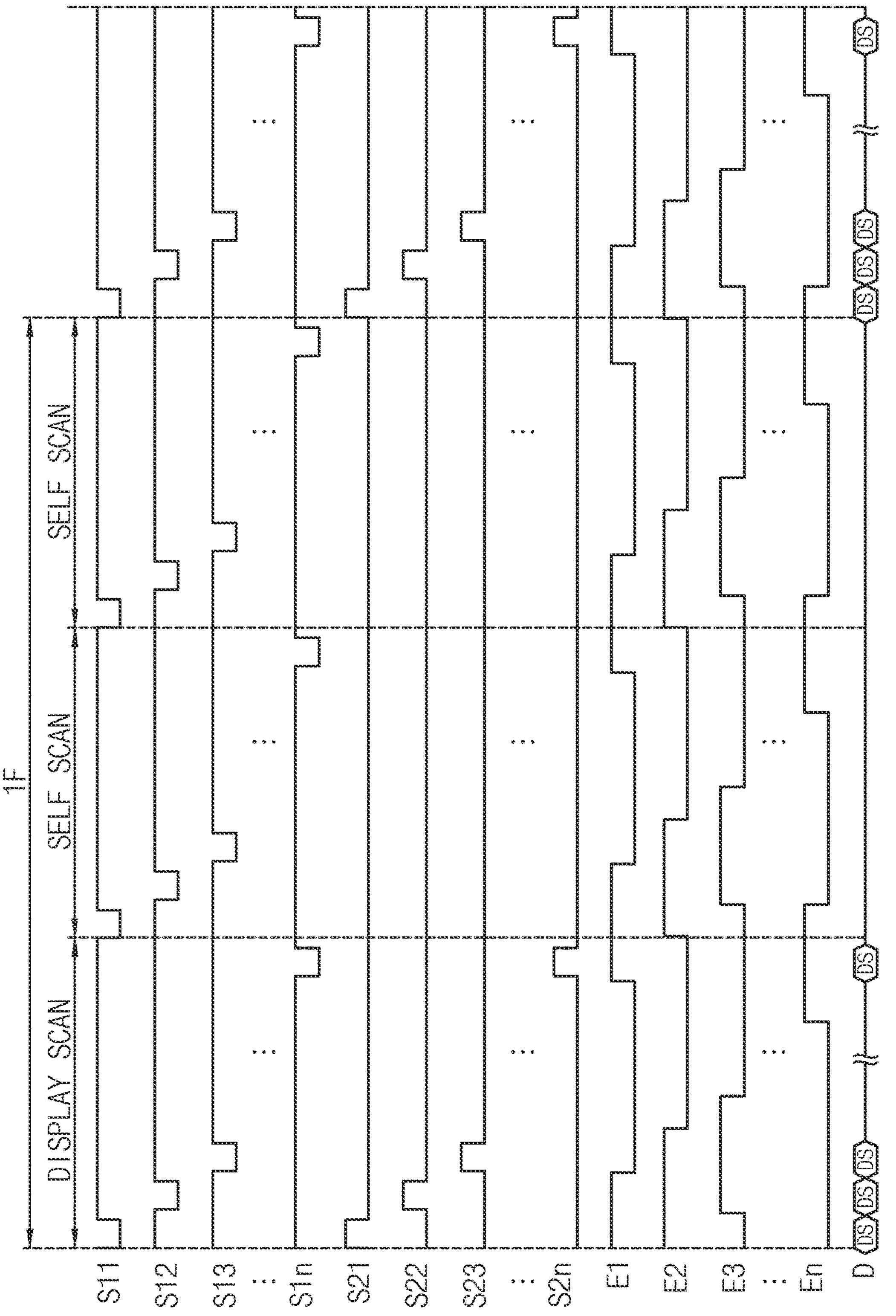
FIG. 4 is a timing diagram illustrating an example in which the display device of FIG. 1 operates at a second driving frequency.

FIG. 1 is a block diagram illustrating a display device according to some embodiments, FIG. 2 is a concept diagram for describing that the display device of FIG. 1 operates, FIG. 3 is a timing diagram illustrating an example in which the display device of FIG. 1 operates at a first driving frequency, and FIG. 4 is a timing diagram illustrating an example in which the display device of FIG. 1 operates at a second driving frequency.

Referring to FIGS. 1 to 4, the display device 100 may include a display panel 110, a first scan driver 120, a second scan driver 125, a data driver 130, an emission control driver 140, and a timing controller 150. Here, the display device 100 may display an image at various driving frequencies according to driving conditions. For example, the display device 100 may display the image at a driving frequency between 1 Hz and 120 Hz (i.e., a frame rate of a panel driving frame may be between 1 Hz and 120 Hz). However, this is merely an example and a range of the driving frequency is not limited to the above range. Here, the display device 100 may be an organic light emitting display device or a quantum-dot light emitting display device. However, the display device 100 is not limited thereto.

The display panel 110 may include pixel circuits 111. For example, the pixel circuits 111 may include a red displaying pixel circuit, a green displaying pixel circuit, and a blue displaying pixel circuit. Here, each of the pixel circuits 111 may include a first scan line S1*j* that transfers a bias control signal GB, and a first gate signal GW (where j is an integer between 1 and n), a second scan line S2*j* that transfers a second gate signal GC, and an initialization control signal GI, a data line Dk that transfers a data signal (where k is an integer between 1 and m), and an emission control line Ej that transfers an emission control signal EM. For convenience of description, although each of the second scan lines S21~S2*n* is illustrated as one line in FIG. 1, it should be understood that each of the second scan lines S21~S2*n* may include a line that transfers the first gate signal GW, a line that transfers the second gate signal GC, and a line that transfers the initialization control signal GI or that a signal applied to one pixel row (e.g., the second gate signal GC) via each of the second scan lines S21~S2*n* may be used as a signal for other pixel rows (e.g., the initialization control signal GI).

Each of the pixel circuits 111 may perform one display scan operation, that is an operation that receives the data signal to emit the light using the light emitting element, when the driving time of the panel driving frame is a minimum driving time. In addition, each of the pixel circuits 111 may perform one display scan operation and at least one self scan operation, that is an operation that changes characteristics of a driving transistor, when the driving time of the panel driving frame is not the minimum driving time.

According to some embodiments, each of the pixel circuits 111 may include a first transistor T1 including a first terminal connected to a first node N1, a gate terminal connected to a second node N2, and a second terminal connected to a third node N3, a second transistor T2 including a first terminal connected to the data line Dk, a second terminal connected to the first node N1, and a gate terminal that receives the first gate signal GW, a third transistor T3 including a first terminal connected to the third node N3, a second terminal connected to the second node N2, and a gate terminal that receives the second gate signal GC, a fourth transistor T4 including a first terminal connected to the second node N2, a second terminal that receives an initialization voltage VINT, and a gate terminal that receives the initialization control signal GI, a fifth transistor T5 including a first terminal that receives a first power voltage VDD, a second terminal connected to the first node N1, and a gate terminal that receives the emission control signal EM, a sixth transistor T6 including a first terminal connected to the third node N3, a second terminal connected to a fourth node N4, and a gate terminal that receives the emission control signal EM, a seventh transistor T7 including a first terminal connected to the fourth node N4, a second terminal connected to a fifth node N5, and a gate terminal that receives the bias control signal GB, a storage capacitor CST including a first terminal that receives the first power voltage VDD, and a second terminal connected to the second node N2, a first capacitor C1 including a first terminal that receives the first gate signal GW, and a second terminal connected to the fourth node N4, and the light emitting element ED including a first terminal connected to the fourth node N4, and a second terminal that receives a second power voltage VSS lower than the first power voltage VDD. However, further details of the embodiments will be described later with reference to FIGS. 5 to 8.

According to some embodiments, each of the pixel circuits 111 may include a first transistor T1 including a first terminal connected to a first node N1, a gate terminal connected to the second node N2, and a second terminal connected to a third node N3, a second transistor T2 including a first terminal connected to the data line Dk, a second terminal connected to the first node N1, and a gate terminal that receives the first gate signal GW, a third transistor T3 including a first terminal connected to the third node N3, a second terminal connected to the second node N2, and a gate terminal that receives the second gate signal GC, a fourth transistor T4 including a first terminal connected to the second node N2, a second terminal that receives a initialization voltage VINT, and a gate terminal that receives the initialization control signal GI, a fifth transistor T5 including a first terminal that receives the first power voltage VDD, a second terminal connected to the first node N1, and a gate terminal that receives an emission control signal EM, a sixth transistor T6 including a first terminal connected to the third node N3, a second terminal connected to a fourth node N4, and a gate terminal that receives the emission control signal EM, a seventh transistor T7 including a first terminal connected to the fourth node N4, a second terminal connected to a fifth node N5, and a gate terminal that receives the bias control signal GB, the storage capacitor CST including a first terminal that receives the first power voltage VDD and a second terminal connected to the second node N2, a second capacitor C2 including a first terminal that receives the emission control signal EM, and a second terminal connected to the fourth node N4 and a light emitting element ED including a first terminal connected to the fourth node N4 and a second terminal that receives the second power voltage lower VSS than the first power voltage VDD. However, further details of the embodiments will be described in more detail later with reference to FIGS. 9 to 12.

The display panel 110 may be connected to the first scan driver 120 via the first scan lines S11~S1*n* and may be connected to the second scan driver 125 via the second scan lines S21~S2*n*.

The first scan driver 120 may provide the bias control signal GB, and the first gate signal GW to the display panel 110 via the first scan lines S11~S1*n*.

The second scan driver 125 may provide the second gate signal GC, and the initialization control signal GI to the display panel 110 via the second scan lines S21~S2*n*.

As illustrated in FIGS. 3 and 4, in a display scan period DISPLAY SCAN in which the pixel circuits 111 perform the display scan operation, the bias control signal GB, and the first gate signal GW that are applied via the first scan lines S11~S1*n* may include at least one turn-on voltage period, and the second gate signal GC, and the initialization control signal GI that are applied via the second scan lines S21~S2*n* may include the turn-on voltage period.

On the other hand, as illustrated in FIGS. 3 and 4, in a self scan period SELF SCAN in which the pixel circuits 111 perform the self scan operation, the bias control signal GB and the first gate signal that are applied via the first scan lines S11~S1*n* may include at least one turn-on voltage period, but the second gate signal GC, and the initialization control signal GI that are applied via the second scan lines S21~S2*n* may not include the turn-on voltage period. In other words, while the bias control signal GB, and the first gate signal GW includes at least one turn-on voltage period in both the display scan period DISPLAY SCAN and the self scan period SELF SCAN, the second gate signal GC, and the initialization control signal GI may include at least one turn-on voltage period in only the display scan period DISPLAY SCAN.

Thus, the bias control signal GB and the first gate signal GW may be driven at a first frequency that is higher than the driving frequency of the display panel 110 (i.e., the frame rate of the panel driving frame). According to some embodiments, the driving frequency of the display panel 110 may be set to be a factor of the first frequency. For example, the first frequency may be set to be two times or four times a maximum driving frequency of the display panel 110. Thus, in one panel driving frame, a scanning operation according to the bias control signal GB, and the first gate signal GW applied to the first scan lines S11~S1*n* may be repeated several times in a cycle (e.g., a set or predetermined cycle). For example, the first scan driver 120 may perform the scanning operation once during the display scan period DISPLAY SCAN at all driving frequencies of the display panel 110 and may perform the scanning operation at least once during the self scan period SELF SCAN at driving frequencies other than the maximum driving frequency of the display panel 110 (here, the self scan period SELF SCAN does not exist at the maximum driving frequency of the display panel 110).

On the other hand, the second gate signal GC, and the initialization control signal GI may be driven at a second frequency that is equal to the driving frequency of the display panel 110 (i.e., the frame rate of the panel driving frame). Thus, the second frequency may be set to be a factor of the first frequency. Thus, in one panel driving frame, a scanning operation according to the second gate signal GC, and the initialization control signal GI applied to the second scan lines S21~S2*n* may be performed once. For example, the second scan driver 125 may perform the scanning operation once during the display scan period DISPLAY SCAN at all driving frequencies of the display panel 110 and may not perform the scanning operation during the self scan period SELF SCAN.

The display panel 110 may be connected to the data driver 130 via data lines D1~Dm. The data driver 130 may provide the data signal (or referred to as a data voltage) to the display panel 110 via the data lines D1~Dm. For example, as illustrated in FIGS. 3 and 4, the data driver 130 may apply the data signal to the display panel 110 in the display scan period DISPLAY SCAN in which the pixel circuits 111 perform the display scan operation and may not apply the data signal to the display panel 110 in the self scan period SELF SCAN in which the pixel circuits 111 perform the self scan operation.

The display panel 110 may be connected to the emission control driver 140 via emission control lines E1~En. The emission control driver 140 may provide the emission control signal EM to the display panel 110 via the emission control lines E1~En. As illustrated in FIGS. 3 and 4, in the display scan period DISPLAY SCAN in which the pixel circuits 111 perform the display scan operation, the emission control signal EM that is applied via the emission control lines E1~En may include at least one turn-on voltage period. In addition, as illustrated in FIGS. 3 and 4, in the self scan period SELF SCAN in which the pixel circuits 111 perform the self scan operation, the emission control signal EM that is applied via the emission control lines E1~En may include at least one turn-on voltage period. Accordingly, the emission control signal EM may be driven at the first frequency that is higher than the driving frequency of the display panel 110 (i.e., the frame rate of the panel driving frame). For example, the first frequency may be set to be two times or four times the maximum driving frequency of the display panel 110. Thus, in one panel driving frame, a scanning operation according to the emission control signal EM applied to the emission control lines E1~En may be repeated several times in a cycle (e.g., a set or predetermined cycle). For example, the emission control driver 140 may perform the scanning operation once during the display scan period DISPLAY SCAN at all driving frequencies of the display panel 110 and may perform the scanning operation at least once during the self scan period SELF SCAN at driving frequencies other than the maximum driving frequency of the display panel 110 (here, the self scan period SELF SCAN does not exist at the maximum driving frequency of the display panel 110).

The timing controller 150 may generate a plurality of control signals CTL1, CTL2, CTL3, and CTL4 to provide the control signals CTL1, CTL2, CTL3, and CTL4 to the first scan driver 120, the second scan driver 125, the data driver 130, and the emission control driver 140. That is, the timing controller 150 may control the first scan driver 120, the second scan driver 125, the data driver 130, and the emission control driver 140. The timing controller 150 may receive image data DATA from an external component (e.g., a graphic processing unit (GPU) and the like) using a specific interface and may perform a specific processing (e.g., luminance compensation, deterioration compensation, and the like) on the image data DATA to provide the processed image data DATA to the data driver 130.

For example, as illustrated in FIGS. 2 to 4, the timing controller 150 may perform one display scan period DISPLAY SCAN and at least one self scan period SELF SCAN at the driving frequencies (i.e., 120 Hz, 80 Hz, 60 Hz, 48 Hz) other than the maximum driving frequency of the display panel 110 (i.e., it is assumed in FIG. 2 that the maximum driving frequency of the display panel 110 is 240 Hz). For example, one panel driving frame 1F may include one display scan period DISPLAY SCAN when the driving frequency of the display panel 110 is 240 Hz, one panel driving frame 1F may include one display scan period DISPLAY SCAN and one self scan period SELF SCAN when the driving frequency of the display panel 110 is 120 Hz, one panel driving frame 1F may include one display scan period DISPLAY SCAN and two self scan periods SELF SCAN when the driving frequency of the display panel 110 is 80 Hz, one panel driving frame 1F may include one display scan period DISPLAY SCAN and three self scan periods SELF SCAN when the driving frequency of the display panel 110 is 60 Hz, and one panel driving frame 1F may include one display scan period DISPLAY SCAN and four self scan periods SELF SCAN when the driving frequency of the display panel 110 is 48 Hz. As described above, the timing controller 150 may respond to a change of the driving frequency of the display panel 110 (i.e., a change of the frame rate of the panel driving frame or a change of the driving time of the panel driving frame) by adjusting the number of the self scan periods SELF SCAN.

Figure 5:
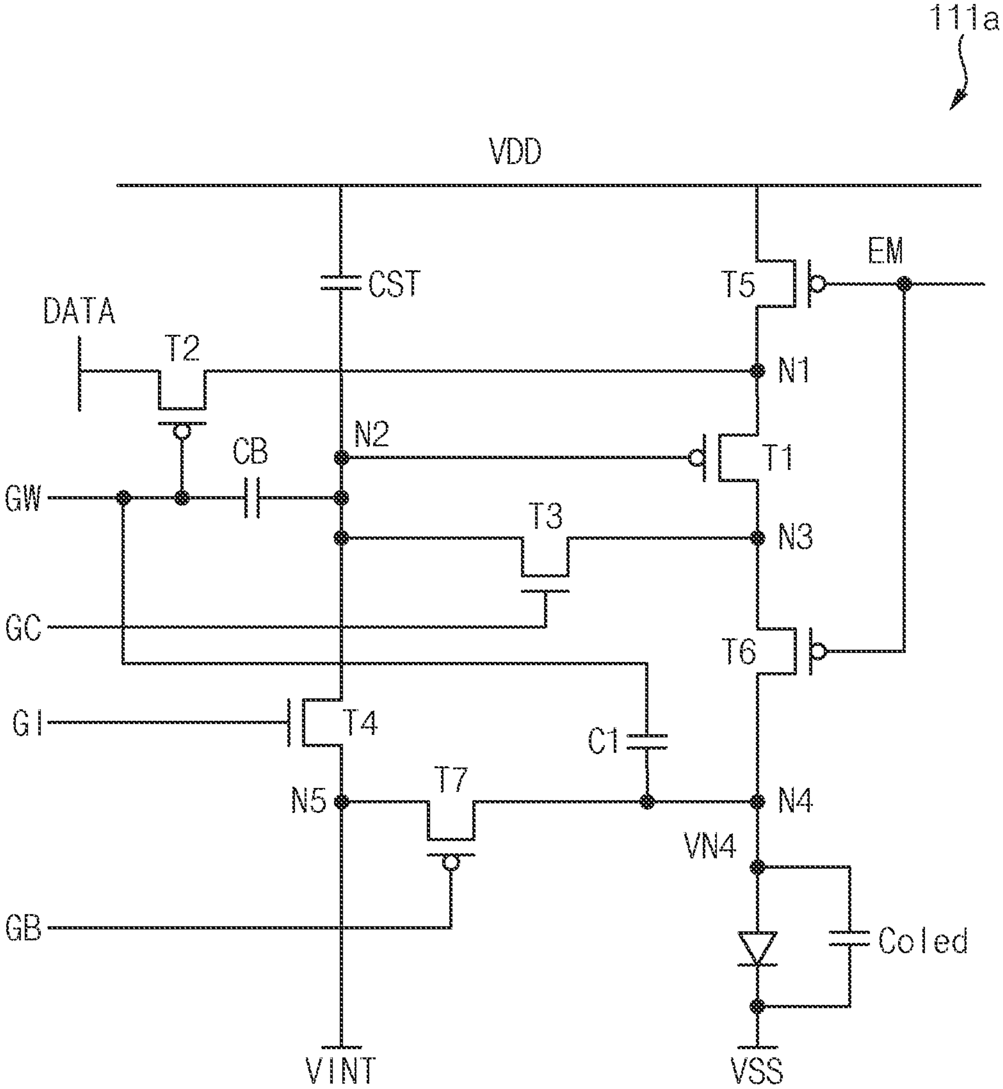
FIG. 5 is a circuit diagram illustrating an example of a pixel circuit included in the display device of FIG. 1.
Figure 6:
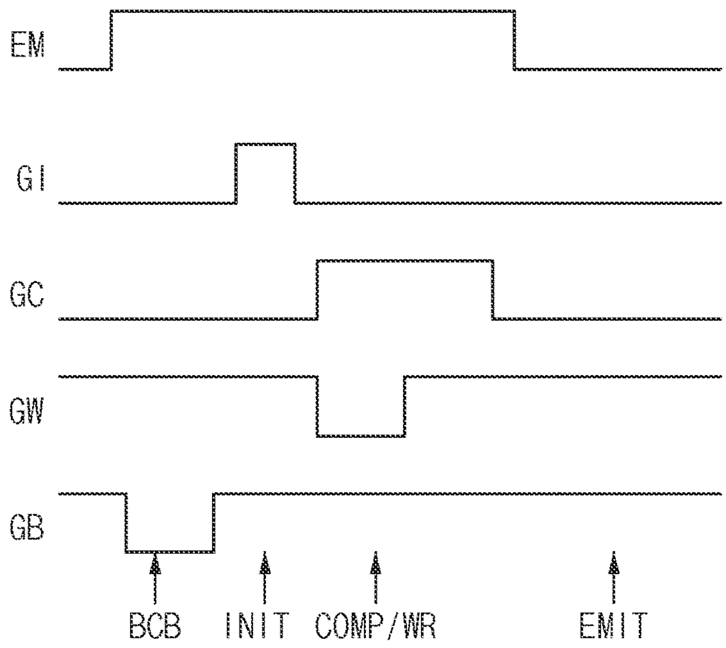
FIG. 6 is a timing diagram illustrating an example in which the pixel circuit of FIG. 5 performs a display scan operation.
Figure 7:
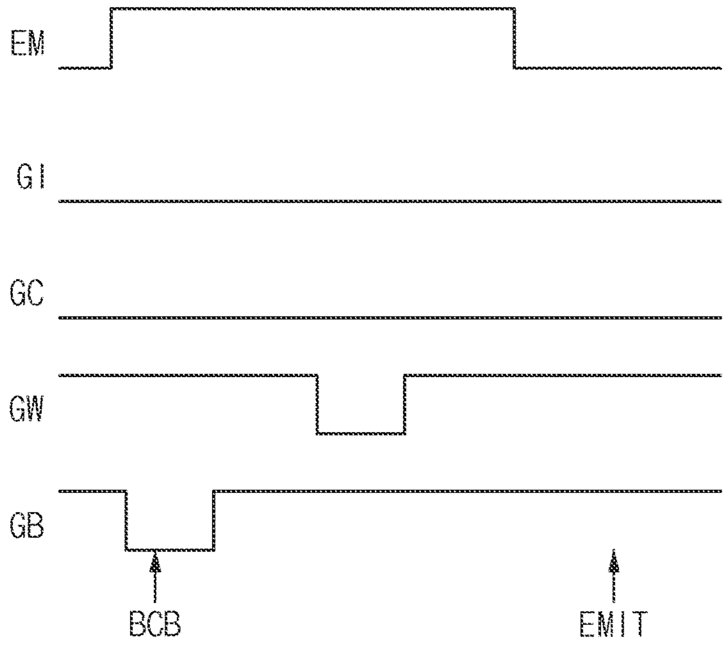
FIG. 7 is a timing diagram illustrating an example in which the pixel circuit of FIG. 5 performs a self scan operation.
Figure 8:
FIG. 8 is a diagram illustrating that a voltage of a fourth node is boosted by a first gate signal applied to a first capacitor included in the pixel circuit of FIG. 5.

FIG. 5 is a circuit diagram illustrating an example of a pixel circuit included in the display device of FIG. 1, FIG. 6 is a timing diagram illustrating an example in which the pixel circuit of FIG. 5 performs a display scan operation, FIG. 7 is a timing diagram illustrating an example in which the pixel circuit of FIG. 5 performs a self scan operation, and FIG. 8 is a diagram illustrating that a voltage of the fourth node is boosted by the first gate signal applied to the first capacitor included in the pixel circuit of FIG. 5.

Referring to FIGS. 5 to 8, the pixel circuit 111*a* may include the first transistor T1, the second transistor T2, the third transistor T3, the fourth transistor T4, the fifth transistor T5, the sixth transistor T6, the seventh transistor T7, the storage capacitor CST, the first capacitor C1, the parasitic capacitor Coled and the light emitting element ED. In some embodiments, the pixel circuit 111*a* may further include the boost capacitor CB.

The first transistor T1 (or referred to as a driving transistor) may include the first terminal connected to the first node N1, the gate terminal connected to the second node N2, and the second terminal connected to the third node N3. The first transistor T1 may control a driving current corresponding to a voltage of the second node N2 (i.e., the data signal stored in the storage capacitor CST) to flow into the light emitting element ED.

The second transistor T2 (or referred to as a switching transistor) may include the first terminal connected to the data line Dk, the second terminal connected to the first node N1, and the gate terminal that receives the first gate signal GW. When the second transistor T2 is turned on in response to the first gate signal GW (i.e., in a turn-on voltage period of the first gate signal GW), the data signal that is applied via the data line Dk may be transferred to the first node N1.

The third transistor T3 (or referred to as a compensation transistor) may include the first terminal connected to the third node N3, the second terminal connected to the second node N2, and the gate terminal that receives the second gate signal GC. When the third transistor T3 is turned on in response to the second gate signal GC (i.e., in a turn-on voltage period of the second gate signal GC), the second terminal (i.e., the third node N3) and the gate terminal (i.e., the second node N2) of the first transistor T1 may be electrically connected to each other. That is, when the third transistor T3 is turned on, the first transistor T1 may be diode-connected, and thus a threshold voltage of the first transistor T1 may be compensated for.

The fourth transistor T4 (or referred to as an initialization transistor) may include the first terminal connected to the second node N2, the second terminal that receives the initialization voltage VINT, and the gate terminal that receives the initialization control signal GI. When the fourth transistor T4 is turned on in response to the initialization control signal GI (i.e., in a turn-on voltage period of the initialization control signal GI), the initialization voltage VINT may be transferred to the second node N2. That is, when the fourth transistor T4 is turned on, the second node N2 (i.e., the gate terminal of the first transistor T1) may be initialized with the initialization voltage VINT, and thus the first transistor T1 may have an on-bias state (i.e., the first transistor T1 may be initialized to be in the on-bias state). Here, the initialization voltage VINT may be set to be a voltage that is lower than the data signal applied via the data line Dk.

For example, the data signal may be transferred to the first node N1 as the second transistor T2 is turned on, and the first transistor T1 may be turned on as the second node N2 is initialized with the first initialization voltage VINT1 that is lower than the data signal. Thus, the data signal transferred to the first node N1 may be transferred to the second node N2 via the first transistor T1 that is diode-connected. Hence, a voltage corresponding to both the data signal and the threshold voltage of the first transistor T1 may be applied to the second node N2, and thus the data signal compensated for the threshold voltage of the first transistor T1 may be stored in the storage capacitor CST. When the display panel 110 operates at a low driving frequency, a hysteresis change of the first transistor T1 may become severe and a flicker phenomenon may be caused. The first initialization voltage VINT1 may be set to be a voltage that is higher than a second power voltage VSS.

The fifth transistor T5 (or referred to as an emission control transistor) may include a first terminal that receives the first power voltage VDD, a second terminal connected to the first node N1, and a gate terminal that receives an emission control signal EM. When the fifth transistor T5 is turned on in response to the emission control signal EM (i.e., in a turn-on voltage period of the emission control signal EM), the light emitting element ED may emit the light by the driving current flowing into the light emitting element ED via the first transistor T1 between the first power voltage VDD and the second power voltage VSS.

The sixth transistor T6 (or referred to as the emission control transistor) may include a first terminal connected to the third node N3, a second terminal connected to a fourth node N4, and a gate terminal that receives the emission control signal EM. When the sixth transistor T6 is turned on in response to the emission control signal EM (i.e., in the turn-on voltage period of the emission control signal EM), the light emitting element ED may emit the light by the driving current flowing into the light emitting element ED via the first transistor T1 between the first power voltage VDD and the second power voltage VSS.

Although it is described above that the fifth transistor T5 and the sixth transistor T6 commonly receive the emission control signal EM to be simultaneously turned on or off, in some embodiments, the fifth transistor T5 and the sixth transistor T6 may receive respective emission control signals independently of each other.

The seventh transistor T7 (or referred to as a reset transistor) may include a first terminal connected to the fourth node N4, a second terminal connected to a fifth node N5, and a gate terminal that receives a bias control signal GB. When the seventh transistor T7 is turned on in response to the bias control signal GB (i.e., in a turn-on voltage period of the bias control signal GB), the initialization voltage VINT may be transferred to the fourth node N4.

According to some embodiments, a voltage VN4 of the fourth node N4 may be boosted by the first gate signal GW applied to the first capacitor C1 included in the pixel circuit 111*a*. For example, as the first gate signal GW is changed from the turn-on voltage VGL to the turn-off voltage VGH, the voltage VN4 of the fourth node N4 may be boosted by the first gate signal GW applied to the first capacitor C1.

FIG. 8 illustrates that the voltage VN4 of the fourth node N4 is boosted by the first gate signal GW applied to the first capacitor C1 included in the pixel circuit of FIG. 5, and the voltage VN4 of the fourth node N4 may be calculated by the following [Equation 1].

$$VN4 = VINT + Vkickback = VINT + \frac{C1}{Coled + C1} \times (VGH - VGL) \qquad \text{Equation1}$$

Here, VN4 may be a voltage of the fourth node N4, VINT may be the initialization voltage, Vkickback may be a boosting voltage, C1 may be a capacitance of the first capacitor, Coled may be a capacitance of the parasitic capacitor, VGH may be the turn-off voltage, and VGL may be the turn-on voltage.

The voltage VN4 of the fourth node N4 may be a sum of the initialization voltage VINT and the boosting voltage Vkickback, and the boosting voltage Vkickback may be a value $$\frac{C1}{(Coled + C1} \times (VGH - VGL))$$

in which a voltage((VGH−VGL)) obtained by subtracting the turn-on voltage VGL of the first gate signal GW from the turn-off voltage VGH of the first gate signal GW, is generated by voltage distribution according to a series connection between the first capacitor C1 and the parasitic capacitor Coled of the light emitting device ED. That is, the voltage VN4 of the fourth node N4 may be boosted by the first gate signal GW applied to the first capacitor C1 included in the pixel circuit 111*a*.

When the first gate signal GW is changed from the turn-on voltage VGL to the turn-off voltage VGH, The boosting voltage Vkickback due to the first gate signal GW may be determined by the series connection between the first capacitor C1 and the parasitic capacitor Coled of the light emitting device ED, and the voltage VN4 of the fourth node N4 may be the sum of the initialization voltage VINT and the boosting voltage Vkickback. Accordingly, the initialization voltage VINT may be applied to the second node N2 through the fourth transistor T4, the voltage VN4 corresponding to the sum of the initialization voltage VINT and the boosting voltage Vkickback may be applied to the fourth node N4, and the voltage VN4 of the fourth node N4 may be higher than the voltage VINT of the second node N2 by $$\frac{C1}{Coled + C1} \times (VGH - VGL).$$

As such, because the pixel circuit 111*a* includes the first capacitor C1, the voltage VN4 of the fourth node N4 may be boosted by the first gate signal GW applied to the first capacitor C1 included in the pixel circuit 111*a*, thus a high resolution may be realized by reducing the number of initialization lines included in the display panel 110 compared to a conventional display device (i.e. a conventional display device includes a first initialization line transferring a first initialization voltage for initializing the second node N2 and a second initialization line transferring a second initialization voltage for resetting the fourth node N4. On the other hand, while the display device of the present inventive concept includes only one initialization line, the display device of the present inventive concept may initialize the second node N2 with the initialization voltage VINT transferred through one initialization line, and reset the fourth node N4 to the boosted initialization voltage added to the initialization voltage VINT and the boosting voltage Vkickback due to the first gate signal GW).

The storage capacitor CST may include a first terminal that receives the first power voltage VDD and a second terminal connected to the second node N2. As described above, because the data signal transferred to the first node N1 is transferred to the second node N2 via the first transistor T1, that is diode-connected, as the second transistor T2 is turned on, the storage capacitor CST may store the data signal compensated for the threshold voltage of the first transistor T1.

The first capacitor C1 may include a first terminal that receives the first gate signal GW, and a second terminal connected to the fourth node N4. As described above, the pixel circuit 111*a* may include the first capacitor C1, and thus the boosting voltage Vkickback due to the first gate signal GW by the serial connection of the first capacitor C1 and the parasitic capacitor Coled of the light emitting device ED may be determined, and the voltage VN4 of the fourth node N4 may be the sum of the initialization voltage VINT and the boosting voltage Vkickback.

Accordingly, the initialization voltage VINT may be applied to the second node N2 through the fourth transistor T4, and the voltage VN4 of the fourth node N4 may be the sum of the initialization voltage VINT and the boosting voltage Vkickback. Thus, the initialization voltage VINT may be applied to the second node N2 through the fourth transistor T4, a voltage VN4 corresponding to the sum of the initialization voltage VINT and the boosting voltage Vkickback may be applied to the fourth node N4, and the voltage VN4 of the fourth node N4 may be higher than the voltage VINT of the second node N2 by $$\frac{C1}{Coled + C1} \times (VGH - VGL).$$

The light emitting element ED may include a first terminal connected to the fourth node N4 and a second terminal that receives the second power voltage VSS lower than the first power voltage VDD. As described above, the light emitting element ED may emit the light having a specific luminance based on the driving current supplied from the first transistor T1.

According to some embodiments, the light emitting element ED may be an organic light emitting element including an organic light emitting layer. According to some embodiments, the light emitting element ED may be an inorganic light emitting element (e.g., quantum-dot) formed of an inorganic material. In some embodiments, a plurality of light emitting elements ED may be connected in parallel and/or in serial between the second power voltage VSS and the fourth node N4.

The boost capacitor CB may include a first terminal connected the second node N2, and a second terminal that receives the first gate signal GW. The boost capacitor CB may boost the voltage of the second node N2.

According to some embodiments, the pixel circuit 111*a* may perform one display scan operation when the driving time of the panel driving frame is the minimum driving time (i.e., when a driving frequency of the display panel 110 is a maximum driving frequency) and may perform one display scan operation and at least one self scan operation when the driving time of the panel driving frame is not the minimum driving time (i.e., when the driving frequency of the display panel 110 is lower than the maximum driving frequency). As described above, the display scan operation may be an operation that receives the data signal to emit the light using the light emitting element ED, and the self scan operation may be an operation that changes characteristics of the first transistor T1 (i.e., the driving transistor).

As illustrated in FIG. 6, when the pixel circuit 111*a* performs the display scan operation, each of the first gate signal GW, the second gate signal GC, the initialization control signal GI, the bias control signal GB, and the emission control signal EM may include at least one turn-on voltage period. According to some embodiments, the turn-on voltage period of the initialization control signal GI, the turn-on voltage period of the first gate signal GW, the turn-on voltage period of the second gate signal GC, and the turn-on voltage period of the bias control signal GB may be positioned in a turn-off voltage period of the emission control signal EM. For example, as illustrated in FIG. 6, the turn-on voltage period of the bias control signal GB may be positioned in the turn-off voltage period of the emission control signal EM. In this case, the turn-on voltage period of the bias control signal GB may be positioned before a turn-on voltage section of the initialization control signal GI.

For example, a reset-bias operation BCB may be performed in the turn-on voltage period of the bias control signal GB. That is, in the turn-on voltage period of the bias control signal GB, the initialization voltage VINT may be applied to the fourth node N4 as the seventh transistor T7 is turned on.

Subsequently, an initializing operation INIT may be performed in the turn-on voltage period of the initialization control signal GI. That is, in the turn-on voltage period of the initialization control signal GI, the first initialization voltage VINT1 may be applied to the second node N2 as the fourth transistor T4 is turned on.

Next, a threshold voltage compensation and data writing operation COMP/WR may be performed in the turn-on voltage period of the first gate signal GW and the turn-on voltage period of the second gate signal GC. That is, in the turn-on voltage period of the first gate signal GW and the turn-on voltage period of the second gate signal GC, the data signal compensated for the threshold voltage of the first transistor T1 may be stored in the storage capacitor CST as the first transistor T1, the second transistor T2, and the third transistor T3 are turned on. In some embodiments, the turn-on voltage period of the second gate signal GC may be longer than the turn-on voltage period of the first gate signal GW, and a portion of the turn-on voltage period of the second gate signal GC may overlap the turn-off voltage period of the first gate signal GW.

In this case, the pixel circuit 111*a* may include the first capacitor C1, and thus the boosting voltage Vkickback due to the first gate signal GW by the serial connection of the first capacitor C1 and the parasitic capacitor Coled of the light emitting device ED may be determined, and the voltage VN4 of the fourth node N4 may be the sum of the initialization voltage VINT and the boosting voltage Vkickback. Accordingly, the initialization voltage VINT may be applied to the second node N2 through the fourth transistor T4, and the voltage VN4 of the fourth node N4 may be the sum of the initialization voltage VINT and the boosting voltage Vkickback. Thus, the initialization voltage VINT may be applied to the second node N2 through the fourth transistor T4, the voltage VN4 corresponding to the sum of the initialization voltage VINT and the boosting voltage Vkickback may be applied to the fourth node N4, and the voltage VN4 of the fourth node N4 may be higher than the voltage VINT of the second node N2 by $$\frac{C1}{Coled + C1} \times (VGH - VGL).$$

Next, a light emitting operation EMIT may be performed in the turn-on voltage period of the emission control signal EM. That is, in the turn-on voltage period of the emission control signal EM, the driving current may flow into the light emitting element ED, and thus the light emitting element ED may emit the light as the fifth transistor T5 and the sixth transistor T6 are turned on.

As illustrated in FIG. 7, when the pixel circuit 111*a* performs the self scan operation, each of the bias control signal GB, the first gate signal GW and the emission control signal EM may include at least one turn-on voltage period, and each of the second gate signal GC, and the initialization control signal GI may not include the turn-on voltage period. In other words, when the pixel circuit 111*a* performs the self scan operation, each of the second gate signal GC, and the initialization control signal GI may include only a turn-off voltage period. According to some embodiments, the turn-on voltage period of the bias control signal GB and the turn-on voltage period of the first gate signal GW may be positioned in the turn-off voltage period of the emission control signal EM. In this case, the turn-on voltage period of the bias control signal GB may be positioned before the turn-on voltage period of the first gate signal GW.

For example, the reset-bias operation BCB may be performed in the turn-off voltage period of the emission control signal EM and the turn-on voltage period of the bias control signal GB. That is, in a state in which the driving current does not flow into the light emitting element ED as the fifth transistor T5 and the sixth transistor T6 are turned off, the initialization voltage VINT may be applied to the fourth node N4 as the seventh transistor T7 is turned on. Next, as the second transistor T2 is turned on, the data signal applied through the data line Dk may be transferred to the first node N1.

In this case, the pixel circuit 111*a* may include the first capacitor C1, and thus the boosting voltage Vkickback due to the first gate signal GW by the serial connection of the first capacitor C1 and the parasitic capacitor Coled of the light emitting device ED may be determined, and the voltage VN4 of the fourth node N4 may be the sum of the initialization voltage VINT and the boosting voltage Vkickback. Accordingly, the initialization voltage VINT may be applied to the second node N2 through the fourth transistor T4, and the voltage VN4 of the fourth node N4 may be the sum of the initialization voltage VINT and the boosting voltage Vkickback. Thus, the initialization voltage VINT may be applied to the second node N2 through the fourth transistor T4, the voltage VN4 corresponding to the sum of the initialization voltage VINT and the boosting voltage Vkickback may be applied to the fourth node N4, and the voltage VN4 of the fourth node N4 may be higher than the voltage VINT of the second node N2 by $$\frac{C1}{Coled + C1} \times (VGH - VGL).$$

Also, since the voltage VN4 of the fourth node N4 may be the sum of the initialization voltage VINT and the boosting voltage Vkickback, the voltage VN4 of the fourth node N4 may be changed by changing the initialization voltage VINT. For example, the boosting voltage Vkickback may be determined by the capacitance of the first capacitor C1 and the capacitance of the parasitic capacitor Coled, and the voltage VN4 of the fourth node N4 may be changed by changing the boosting voltage Vkickback, but according to some embodiments, the initialization voltage VINT may be changed to change the voltage VN4 of the fourth node N4.

Next, the light emitting operation EMIT may be performed in the turn-on voltage period of the emission control signal EM. That is, in the turn-on voltage period of the emission control signal EM, the driving current may flow into the light emitting element ED, and thus the light emitting element ED may emit the light as the fifth transistor T5 and the sixth transistor T6 are turned on.

As such, the pixel circuit 111*a* may include the first transistor T1 including the first terminal connected to the first node N1, the gate terminal connected to the second node N2, and the second terminal connected to the third node N3, the second transistor T2 including the first terminal connected to the data line Dk, the second terminal connected to the first node N1, and the gate terminal that receives the first gate signal GW, the third transistor T3 including the first terminal connected to the third node N3, the second terminal connected to the second node N2, and the gate terminal that receives the second gate signal GC, the fourth transistor T4 including the first terminal connected to the second node N2, the second terminal that receives the initialization voltage VINT, and the gate terminal that receives the initialization control signal GI, the fifth transistor T5 including the first terminal that receives the first power voltage VDD, the second terminal connected to the first node N1, and the gate terminal that receives the emission control signal EM, the sixth transistor T6 including the first terminal connected to the third node T3, the second terminal connected to the fourth node N4, and the gate terminal that receives the emission control signal EM, the seventh transistor T7 including the first terminal connected to the fourth node N4, the second terminal connected to the fifth node N5, and the gate terminal that receives the bias control signal GB, the storage capacitor CST including the first terminal that receives the first power voltage VDD, and the second terminal connected to the second node N2, the first capacitor C1 including the first terminal that receives the first gate signal GW, and the second terminal connected to the fourth node N4 and the light emitting element ED including the first terminal connected to the fourth node N1, and the second terminal that receives the second power voltage VSS lower than the first power voltage VDD (In some embodiments, the boost capacitor CB may further include the first terminal connected to the second node N2 and the second terminal connected to the first gate signal GW).

Figure 9:
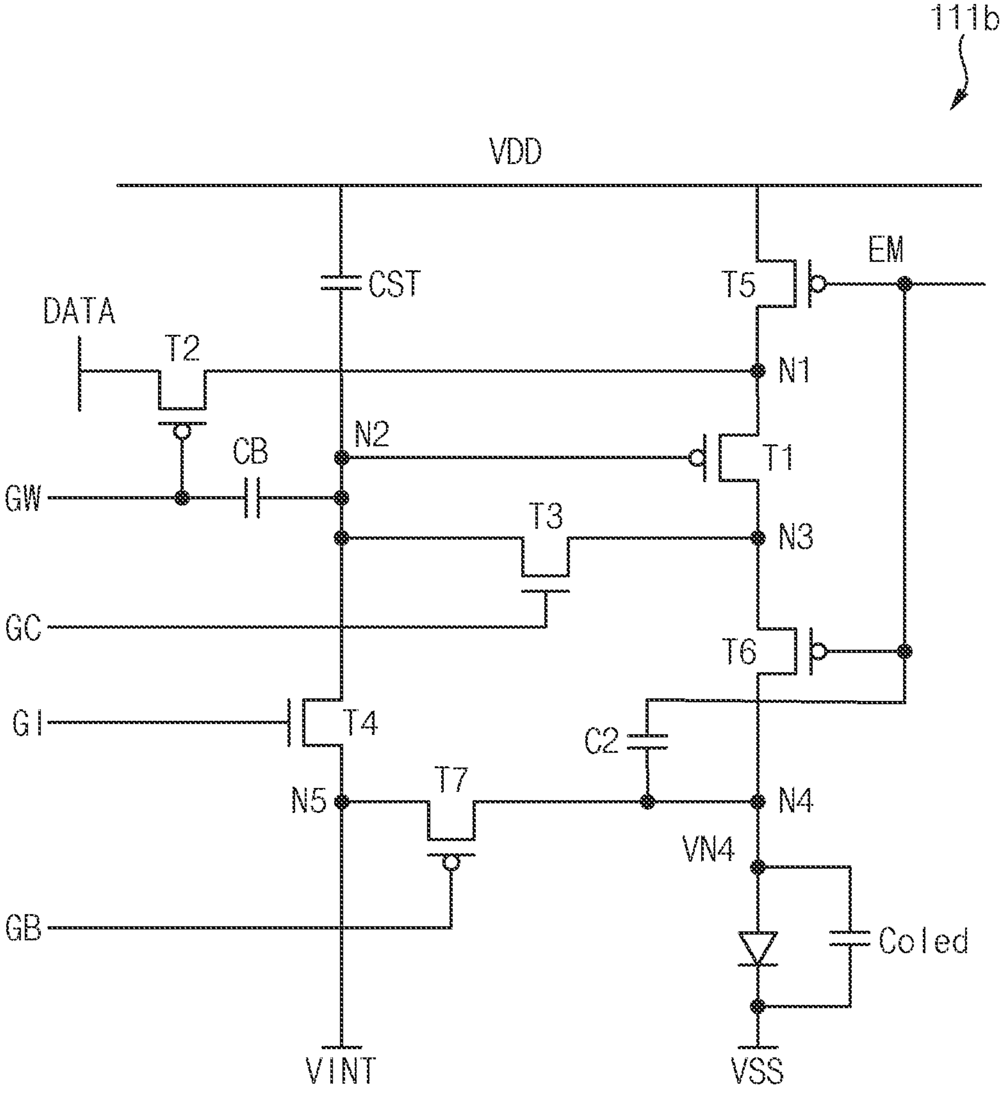
FIG. 9 is a circuit diagram illustrating another example of the pixel circuit included in the display device of FIG. 1.
Figure 10:
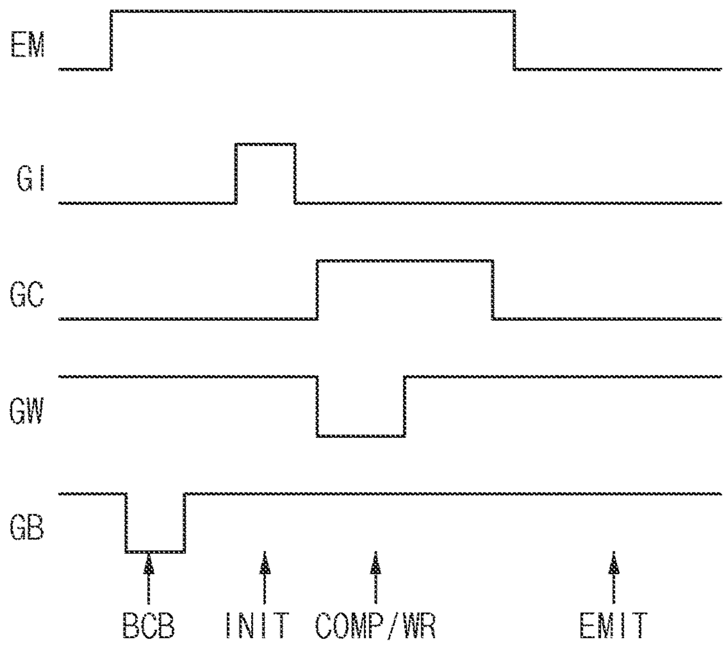
FIG. 10 is a timing diagram illustrating an example in which the pixel circuit of FIG. 9 performs the display scan operation.
Figure 11:
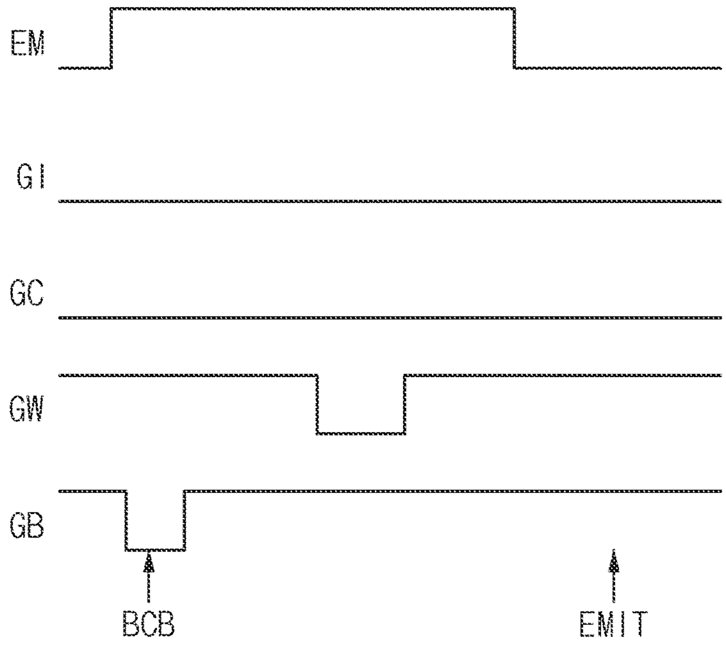
FIG. 11 is a timing diagram illustrating an example in which the pixel circuit of FIG. 9 performs the self scan operation.
Figure 12:
FIG. 12 is a diagram illustrating that a voltage of a fourth node is boosted by a first gate signal applied to the first capacitor included in the pixel circuit of FIG. 9.

FIG. 9 is a circuit diagram illustrating another example of the pixel circuit included in the display device of FIG. 1. FIG. 10 is a timing diagram illustrating an example in which the pixel circuit of FIG. 9 performs the display scan operation. FIG. 11 is a timing diagram illustrating an example in which the pixel circuit of FIG. 9 performs the self scan operation. FIG. 12 is a diagram illustrating that a voltage of a fourth node is boosted by a first gate signal applied to the first capacitor included in the pixel circuit of FIG. 9.

Referring to FIGS. 9 to 12, the pixel circuit 111*b* may include a first transistor T1, a second transistor T2, a third transistor T3, a fourth transistor T4, a fifth transistor T5, a sixth transistor T6, a seventh transistor T7, a storage capacitor CST, a second transistor C2 and a light emitting element ED. In some embodiments, the pixel circuit 111*b* may further include a boost capacitor CB. Except for a connection structure of the second capacitor C2, the pixel circuit 111*b* of FIG. 9 may be substantially equal to the pixel circuit 111*a* of FIG. 5. Thus, in the description of the pixel circuit 111*b* of FIG. 9, a description that overlaps with the pixel circuit 111*a* of FIG. 5 will be omitted. When the seventh transistor T7 is turned on in response to the bias control signal GB (i.e., in a turn-on voltage period of the bias control signal GB), the initialization voltage VINT may be transferred to the fourth node N4 through the seventh transistor T7. According to some embodiments, a voltage VN4 of the fourth node N4 may be boosted by the emission control signal EM applied to the second capacitor C2 included in the pixel circuit 111*b*. For example, as the emission control signal EM is changed from the turn-off voltage VGH to the turn-on voltage VGL, the voltage VN4 of the fourth node N4 may be boosted by the emission control signal EM applied to the second capacitor C2.

FIG. 12 illustrates that the voltage VN4 of the fourth node N4 is boosted by the emission control signal EM applied to the second capacitor C2 included in the pixel circuit of FIG. 9, and the voltage VN4 of the fourth node N4 may be calculated by the following [Equation 2].

Equation 2

$$VN4 = VINT + Vkickback = VINT + \frac{C2}{Coled + C2} \times (VGH - VGL)$$

Here, VN4 may be the voltage of the fourth node N4, VINT may be the initialization voltage, Vkickback may be the boosting voltage, C2 may be a capacitance of the second capacitor, Coled may be a capacitance of the parasitic capacitor, VGH may be the turn-off voltage, and VGL may be the turn-on voltage.

The voltage VN4 of the fourth node N4 may be a sum of the initialization voltage VINT and the boosting voltage Vkickback, and the boosting voltage Vkickback may be a value $$\frac{C2}{(Coled + C2} \times (VGH - VGL))$$

in which a voltage((VGL−VGH)) obtained by subtracting the turn-off voltage VGH of the emission control signal EM from the turn-on voltage VGL of the emission control signal EM is generated by voltage distribution according to a series connection between the second capacitor C2 and the parasitic capacitor Coled of the light emitting device ED.

That is, the voltage VN4 of the fourth node N4 may be boosted by the emission control signal EM applied to the second capacitor C2 included in the pixel circuit 111*b*. When the emission control signal EM is changed from the turn-off voltage VGH to the turn-on voltage VGL, The boosting voltage Vkickback due to the emission control signal EM may be determined by the series connection between the second capacitor C2 and the parasitic capacitor Coled of the light emitting device ED, and the voltage VN4 of the fourth node N4 may be the sum of the initialization voltage VINT and the boosting voltage Vkickback. Accordingly, the initialization voltage VINT may be applied to the second node N2 through the fourth transistor T4, the voltage VN4 corresponding to the sum of the initialization voltage VINT and the boosting voltage Vkickback may be applied to the fourth node N4, and the voltage VN4 of the fourth node N4 may be lower than the voltage VINT of the second node N2 by $$\frac{C2}{Coled + C2} \times (VGH - VGL).$$

As such, since the pixel circuit 111*b* includes the second capacitor C2, the voltage VN4 of the fourth node N4 may be boosted by the emission control signal GW applied to the second capacitor C2 included in the pixel circuit 111*b*, thus a high resolution may be realized by reducing the number of initialization lines included in the display panel 110 compared to a conventional display device (i.e. a conventional display device includes a first initialization line transferring a first initialization voltage for initializing the second node N2 and a second initialization line transferring a second initialization voltage for resetting the fourth node N4. On the other hand, while the display device of the present inventive concept includes only one initialization line, the display device of the present inventive concept may initialize the second node N2 with the initialization voltage VINT transferred through one initialization line, and reset the fourth node N4 to the boosted initialization voltage added to the initialization voltage VINT and the boosting voltage Vkickback due to the emission control signal EM).

The second capacitor C2 may include a first terminal that receives the emission control signal EM, and a second terminal connected to the fourth node N4. As described above, the pixel circuit 111*b* may include the second capacitor C2, and thus the boosting voltage Vkickback due to the emission control signal EM by the serial connection of the second capacitor C2 and the parasitic capacitor Coled of the light emitting device ED may be determined, and the voltage VN4 of the fourth node N4 may be the sum of the initialization voltage VINT and the boosting voltage Vkickback. Accordingly, the initialization voltage VINT may be applied to the second node N2 through the fourth transistor T4, and the voltage VN4 of the fourth node N4 may be the sum of the initialization voltage VINT and the boosting voltage Vkickback. Thus, the initialization voltage VINT may be applied to the second node N2 through the fourth transistor T4, a voltage VN4 corresponding to the sum of the initialization voltage VINT and the boosting voltage Vkickback may be applied to the fourth node N4, and the voltage VN4 of the fourth node N4 may be lower than the voltage VINT of the second node N2 by $$\frac{C2}{Coled + C2} \times (VGH - VGL).$$

According to some embodiments, the pixel circuit 111*b* may perform one display scan operation when the driving time of the panel driving frame is the minimum driving time (i.e., when a driving frequency of the display panel 110 is a maximum driving frequency) and may perform one display scan operation and at least one self scan operation when the driving time of the panel driving frame is not the minimum driving time (i.e., when the driving frequency of the display panel 110 is lower than the maximum driving frequency). As described above, the display scan operation may be an operation that receives the data signal to emit the light using the light emitting element ED, and the self scan operation may be an operation that changes characteristics of the first transistor T1 (i.e., the driving transistor).

As illustrated in FIG. 10, when the pixel circuit 111*b* performs the display scan operation, each of the first gate signal GW, the second gate signal GC, the initialization control signal GI, the bias control signal GB, and the emission control signal EM may include at least one turn-on voltage period. According to some embodiments, the turn-on voltage period of the initialization control signal GI, the turn-on voltage period of the first gate signal GW, the turn-on voltage period of the second gate signal GC, and the turn-on voltage period of the bias control signal GB may be positioned in a turn-off voltage period of the emission control signal EM. For example, as illustrated in FIG. 10, the turn-on voltage period of the bias control signal GB may be positioned in the turn-off voltage period of the emission control signal EM. In this case, the turn-on voltage period of the bias control signal GB may be positioned before a turn-on voltage section of the initialization control signal GI.

For example, a reset-bias operation BCB may be performed in the turn-on voltage period of the bias control signal GB. That is, in the turn-on voltage period of the bias control signal GB, the initialization voltage VINT may be applied to the fourth node N4 as the seventh transistor T7 is turned on.

Subsequently, an initializing operation INIT may be performed in the turn-on voltage period of the initialization control signal GI. That is, in the turn-on voltage period of the initialization control signal GI, the initialization voltage VINT may be applied to the second node N2 as the fourth transistor T4 is turned on.

Next, a threshold voltage compensation and data writing operation COMP/WR may be performed in the turn-on voltage period of the first gate signal GW and the turn-on voltage period of the second gate signal GC. That is, in the turn-on voltage period of the first gate signal GW and the turn-on voltage period of the second gate signal GC, the data signal compensated for the threshold voltage of the first transistor T1 may be stored in the storage capacitor CST as the first transistor T1, the second transistor T2, and the third transistor T3 are turned on. In some embodiments, the turn-on voltage period of the second gate signal GC may be longer than the turn-on voltage period of the first gate signal GW, and a portion of the turn-on voltage period of the second gate signal GC may overlap the turn-off voltage period of the first gate signal GW.

In this case, the pixel circuit 111*b* may include the second capacitor C2, and thus the boosting voltage Vkickback due to the emission control signal EM by the serial connection of the second capacitor C2 and the parasitic capacitor Coled of the light emitting device ED may be determined, and the voltage VN4 of the fourth node N4 may be the sum of the initialization voltage VINT and the boosting voltage Vkickback. Accordingly, the initialization voltage VINT may be applied to the second node N2 through the fourth transistor T4, and the voltage VN4 of the fourth node N4 may be the sum of the initialization voltage VINT and the boosting voltage Vkickback. Thus, the initialization voltage VINT may be applied to the second node N2 through the fourth transistor T4, the voltage VN4 corresponding to the sum of the initialization voltage VINT and the boosting voltage Vkickback may be applied to the fourth node N4, and the voltage VN4 of the fourth node N4 may be lower than the voltage VINT of the second node N2 by $$\frac{C2}{Coled + C2} \times (VGH - VGL).$$

Next, a light emitting operation EMIT may be performed in the turn-on voltage period of the emission control signal EM. That is, in the turn-on voltage period of the emission control signal EM, the driving current may flow into the light emitting element ED, and thus the light emitting element ED may emit the light as the fifth transistor T5 and the sixth transistor T6 are turned on.

As illustrated in FIG. 11, when the pixel circuit 111*b* performs the self scan operation, each of the bias control signal GB, the first gate signal GW and the emission control signal EM may include at least one turn-on voltage period, and each of the second gate signal GC, and the initialization control signal GI may not include the turn-on voltage period. In other words, when the pixel circuit 111*b* performs the self scan operation, each of the second gate signal GC, and the initialization control signal GI may include only a turn-off voltage period. According to some embodiments, the turn-on voltage period of the bias control signal GB and the turn-on voltage period of the first gate signal GW may be positioned in the turn-off voltage period of the emission control signal EM. In this case, the turn-on voltage period of the bias control signal GB may be positioned before the turn-on voltage period of the first gate signal GW.

For example, the reset-bias operation BCB may be performed in the turn-off voltage period of the emission control signal EM and the turn-on voltage period of the bias control signal GB. That is, in a state in which the driving current does not flow into the light emitting element ED as the fifth transistor T5 and the sixth transistor T6 are turned off, the initialization voltage VINT may be applied to the fourth node N4 as the seventh transistor T7 is turned on. Next, as the second transistor T2 is turned on, the data signal applied through the data line Dk may be transferred to the first node N1. Next, the light emitting operation EMIT may be performed in the turn-on voltage period of the emission control signal EM. That is, in the turn-on voltage period of the emission control signal EM, the driving current may flow into the light emitting element ED, and thus the light emitting element ED may emit the light as the fifth transistor T5 and the sixth transistor T6 are turned on.

In this case, the pixel circuit 111*b* may include the second capacitor C2, and thus the boosting voltage Vkickback due to the emission control signal EM by the serial connection of the second capacitor C2 and the parasitic capacitor Coled of the light emitting device ED may be determined, and the voltage VN4 of the fourth node N4 may be the sum of the initialization voltage VINT and the boosting voltage Vkickback. Accordingly, the initialization voltage VINT may be applied to the second node N2 through the fourth transistor T4, and the voltage VN4 of the fourth node N4 may be the sum of the initialization voltage VINT and the boosting voltage Vkickback. Thus, the initialization voltage VINT may be applied to the second node N2 through the fourth transistor T4, the voltage VN4 corresponding to the sum of the initialization voltage VINT and the boosting voltage Vkickback may be applied to the fourth node N4, and the voltage VN4 of the fourth node N4 may be lower than the voltage VINT of the second node N2 by $$\frac{C2}{Coled + C2} \times (VGH - VGL).$$

Also, since the voltage VN4 of the fourth node N4 may be the sum of the initialization voltage VINT and the boosting voltage Vkickback, the voltage VN4 of the fourth node N4 may be changed by changing the initialization voltage VINT. For example, the boosting voltage Vkickback may be determined by the capacitance of the second capacitor C2 and the capacitance of the parasitic capacitor Coled, and the voltage VN4 of the fourth node N4 may be changed by changing the boosting voltage Vkickback, but according to some embodiments, the initialization voltage VINT may be changed to change the voltage VN4 of the fourth node N4.

As such, the pixel circuit 111*b* may include the first transistor T1 including the first terminal connected to the first node N1, the gate terminal connected to the second node N2, and the second terminal connected to the third node N3, the second transistor T2 including the first terminal connected to the data line Dk, the second terminal connected to the first node N1, and the gate terminal that receives the first gate signal GW, the third transistor T3 including the first terminal connected to the third node N3, the second terminal connected to the second node N2, and the gate terminal that receives the second gate signal GC, the fourth transistor T4 including the first terminal connected to the second node N2, the second terminal that receives the initialization voltage VINT, and the gate terminal that receives the initialization control signal GI, the fifth transistor T5 including the first terminal that receives the first power voltage VDD, the second terminal connected to the first node N1, and the gate terminal that receives the emission control signal EM, the sixth transistor T6 including the first terminal connected to the third node N3, the second terminal connected to the fourth node, and the gate terminal that receives the emission control signal EM, the seventh transistor T7 including the first terminal connected to the fourth node N4, the second terminal connected to the fifth node N5, and the gate terminal that receives the bias control signal GB, the storage capacitor CST including the first terminal that receives the first power voltage VDD and the second terminal connected to the second node N2, the second capacitor C2 including the first terminal that receives the emission control signal EM, and the second terminal connected to the fourth node N4 and the light emitting element ED including the first terminal connected to the fourth node N4 and the second terminal that receives the second power voltage VSS lower than the first power voltage VDD (In some embodiments, the boost capacitor CB may further include the first terminal connected to the second node N2 and the second terminal connected to the first gate signal GW).

Figure 13:
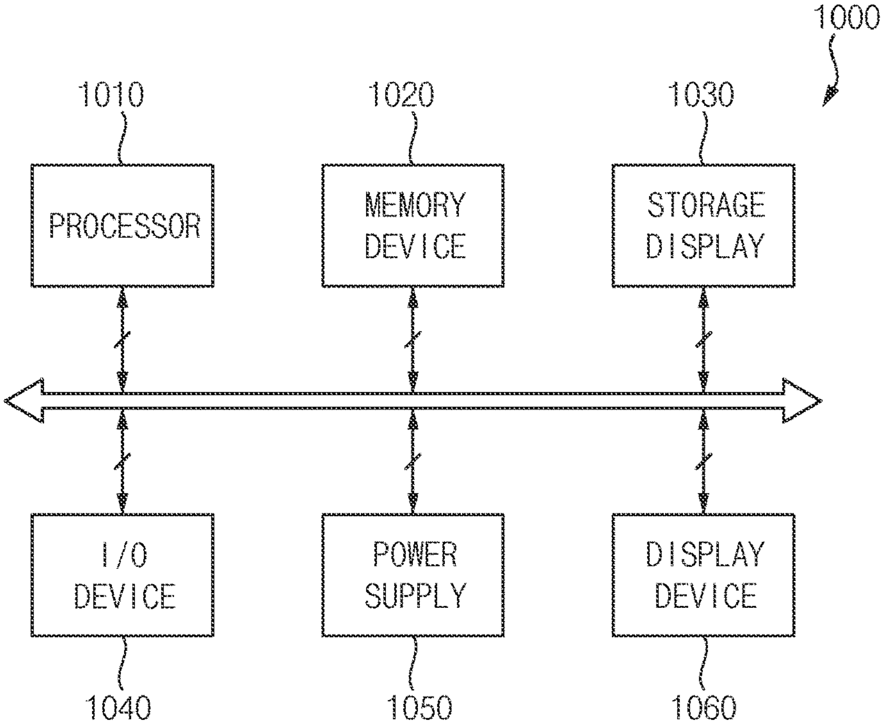
FIG. 13 is a block diagram illustrating an electronic device according to some embodiments.
Figure 14:
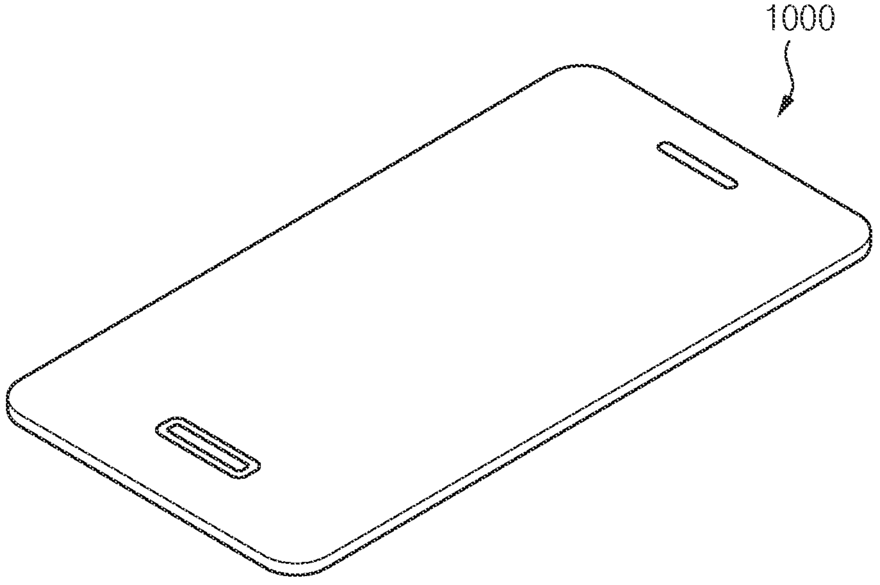
FIG. 14 is a diagram illustrating an example in which the electronic device of FIG. 13 is implemented as a smart phone.

FIG. 13 is a block diagram illustrating an electronic device according to some embodiments. FIG. 14 is a diagram illustrating an example in which the electronic device of FIG. 11 is implemented as a smart phone.

Referring to FIGS. 13 and 14, the electronic device 1000 may include a processor 1010, a memory device 1020, a storage device 1030, an input/output (I/O) device 1040, a power supply 1050, and a display device 1060. The display device 1060 may be the display device 100 of FIG. 1. In addition, the electronic device 1000 may further include a plurality of ports for communicating with a video card, a sound card, a memory card, a universal serial bus (USB) device, other electronic device, and the like. According to some embodiments, as illustrated in FIG. 14, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD) device, and the like.

The processor 1010 may perform certain calculations or tasks. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060. The power supply 1050 may provide power for operations of the electronic device 1000. The display device 1060 may be connected to other components through the buses or other communication links.

The display device 1060 may display an image corresponding to a visual information of the electronic device 1000. In this case, the display device 1060 may be the organic light emitting display device or the quantum dot light emitting display device, but is not limited thereto. A conventional display device includes the first initialization line for initializing the gate terminal of the driving transistor T1 and the second initialization wire for resetting the first terminal (i.e. an anode) of the light emitting element ED. On the other hand, the present inventive concept may allow the one initialization line to perform the above two roles, thereby increasing the screen resolution. For example, in order to initialize the gate terminal of the driving transistor T1 and to reset the first terminal of the light emitting element ED, the initialization voltages of the first and second initialization lines may be different from each other. Accordingly, in the conventional display device, the first initialization line and the second initialization line are separated, but in the display device 1060 according to some embodiments of the present inventive concept, the pixel circuit 111 may include the first capacitor C1 or the second capacitor C2 in order to perform the above two roles through the one initialization line. Accordingly, the initialization voltage VINT applied to the gate terminal of the driving transistor T1 may be changed between the first capacitor C1 or the second capacitor C2 and the light emitting device ED by the first gate signal GW or the emission control signal EM.

The pixel circuit 111 may include the first transistor T1 including the first terminal connected to the first node N1, the gate terminal connected to the second node N2, and the second terminal connected to the third node N3, the second transistor T2 including the first terminal connected to the data line Dk, the second terminal connected to the first node N1, and the gate terminal that receives the first gate signal GW, the third transistor T3 including the first terminal connected to the third node N3, the second terminal connected to the second node N2, and the gate terminal that receives the second gate signal GC, the fourth transistor T4 including the first terminal connected to the second node N2, the second terminal that receives the initialization voltage VINT, and the gate terminal that receives the initialization control signal GI, the fifth transistor T5 including the first terminal that receives the first power voltage VDD, the second terminal connected to the first node N1, and the gate terminal that receives the emission control signal EM, the sixth transistor T6 including the first terminal connected to the third node T3, the second terminal connected to the fourth node N4, and the gate terminal that receives the emission control signal EM, the seventh transistor T7 including the first terminal connected to the fourth node N4, the second terminal connected to the fifth node N5, and the gate terminal that receives the bias control signal GB, the storage capacitor CST including the first terminal that receives the first power voltage VDD, and the second terminal connected to the second node N2, the first capacitor C1 including the first terminal that receives the first gate signal GW, and the second terminal connected to the fourth node N4 and the light emitting element ED including the first terminal connected to the fourth node N1, and the second terminal that receives the second power voltage VSS lower than the first power voltage VDD (In some embodiments, the boost capacitor CB may further include the first terminal connected to the second node N2 and the second terminal connected to the first gate signal GW).

Aspects of some embodiments according to the present disclosure may be applied to any display device and any electronic devices including the same. For example, the inventive concepts may be applied to a mobile phone, a smart phone, a video phone, a smart pad, a smart watch, a tablet PC, a vehicle navigation system, a television, a computer monitor, a notebook computer, a digital camera, a head mounted display, and the like.

The foregoing is illustrative of the present inventive concept and is not to be construed as limiting thereof. Although aspects of some embodiments of the present inventive concept have been described, those skilled in the art will readily appreciate that many modifications are possible in the example embodiments without materially departing from the novel teachings and advantages of the present inventive concept.

What is claimed is:

1. A pixel circuit comprising:

a first transistor including a first terminal connected to a first node, a gate terminal connected to a second node, and a second terminal connected to a third node;

a second transistor including a first terminal connected to a data line, a second terminal connected to the first node, and a gate terminal configured to receive a first gate signal from a first scan line;

a third transistor including a first terminal connected to the third node, a second terminal connected to the second node, and a gate terminal configured to receive a second gate signal;

a fourth transistor including a first terminal connected to the second node, a second terminal configured to receive an initialization voltage, and a gate terminal configured to receive an initialization control signal;

a fifth transistor including a first terminal configured to receive a first power voltage, a second terminal connected to the first node, and a gate terminal configured to receive an emission control signal;

a sixth transistor including a first terminal connected to the third node, a second terminal connected to a fourth node, and a gate terminal configured to receive the emission control signal;

a seventh transistor including a first terminal connected to the fourth node, a second terminal connected to a fifth node, and a gate terminal configured to receive a bias control signal from the first scan line;

a storage capacitor including a first terminal configured to receive the first power voltage and a second terminal connected to the second node;

a first capacitor including a first terminal configured to receive the first gate signal and a second terminal connected to the fourth node; and a light emitting element including a first terminal connected to the fourth node and a second terminal configured to receive a second power voltage lower than the first power voltage, wherein the first gate signal is configured to boost a voltage of the fourth node through the first capacitor, wherein a boosting voltage due to the first gate signal is determined by a series connection of the first capacitor and a parasitic capacitor of the light emitting element, and wherein the voltage of the fourth node is a sum of the initialization voltage and the boosting voltage.

2. The pixel circuit of claim 1, wherein, based on a driving time of a panel driving frame being a reference driving time, one display scan operation is performed, and wherein, based on the driving time of the panel driving frame not being the reference driving time, one display scan operation and at least one self scan operation are performed.

3. The pixel circuit of claim 2, wherein, based on the display scan operation being performed, each of the first gate signal, the second gate signal, the initialization control signal, the bias control signal, and the emission control signal includes at least one turn-on voltage period.

4. The pixel circuit of claim 3, wherein, within a turn-off voltage period of the emission control signal, the turn-on voltage period of the initialization control signal, the turn-on voltage period of the first gate signal, the turn-on voltage period of the second gate signal, and the turn-on voltage period of the bias control signal are located.

5. The pixel circuit of claim 2, wherein, based on the self scan operation being performed, each of the bias control signal, the first gate signal, and the emission control signal includes at least one turn-on voltage period, and each of the second gate signal and the initialization control signal does not include the turn-on voltage period.

6. The pixel circuit of claim 5, wherein, within a turn-off voltage period of the emission control signal, each of the first gate signal and the bias control signal includes at least one turn-on voltage period.

7. The pixel circuit of claim 1, further comprising:

a boost capacitor including a first terminal connected the second node and a second terminal configured to receive the first gate signal.

8. A display device comprising:

a display panel including pixels;

a scan driver configured to apply a bias control signal, an initialization control signal, a first gate signal, and a second gate signal to each of the pixels;

a data driver configured to apply data voltages to the pixels; and a timing controller configured to control the scan driver and the data driver, and wherein a pixel circuit of each of the pixels includes:

a first transistor including a first terminal connected to a first node, a gate terminal connected to a second node, and a second terminal connected to a third node;

a second transistor including a first terminal connected to a data line, a second terminal connected to the first node, and a gate terminal configured to receive the first gate signal from a first scan line;

a third transistor including a first terminal connected to the third node, a second terminal connected to the second node, and a gate terminal configured to receive the second gate signal;

a fourth transistor including a first terminal connected to the second node, a second terminal configured to receive an initialization voltage, and a gate terminal configured to receive the initialization control signal;

a fifth transistor including a first terminal configured to receive a first power voltage, a second terminal connected to the first node, and a gate terminal configured to receive an emission control signal;

a sixth transistor including a first terminal connected to the third node, a second terminal connected to a fourth node, and a gate terminal configured to receive the emission control signal;

a seventh transistor including a first terminal connected to the fourth node, a second terminal connected to a fifth node, and a gate terminal configured to receive the bias control signal from the first scan line;

a storage capacitor including a first terminal configured to receive the first power voltage and a second terminal connected to the second node;

a first capacitor including a first terminal configured to receive the first gate signal and a second terminal connected to the fourth node; and a light emitting element including a first terminal connected to the fourth node and a second terminal configured to receive a second power voltage lower than the first power voltage, wherein the first gate signal boosts a voltage of the fourth node through the first capacitor, wherein a boosting voltage due to the first gate signal is determined by a series connection of the first capacitor and a parasitic capacitor of the light emitting element, and wherein the voltage of the fourth node is a sum of the initialization voltage and the boosting voltage.

* * * * *